(12) United States Patent
Puiggalí Allepuz et al.

(10) Patent No.: US 8,713,319 B2
(45) Date of Patent: Apr. 29, 2014

(54) PRESERVING PRIVACY OF DIGITAL COMMUNICATION INFORMATION

(75) Inventors: Jorge Puiggalí Allepuz, Barcelona (ES); Sandra Guasch Castelló, Barcelona (ES)

(73) Assignee: Scytl Secure Electronic Voting, SA (ES)

( * ) Notice: Subject to any disclaimer, the term of this patent is extended or adjusted under 35 U.S.C. 154(b) by 0 days.

(21) Appl. No.: 13/513,613

(22) PCT Filed: Dec. 1, 2010

(86) PCT No.: PCT/ES2010/000490
§ 371 (c)(1),
(2), (4) Date: Jun. 4, 2012

(87) PCT Pub. No.: WO2011/067437
PCT Pub. Date: Jun. 9, 2011

(65) Prior Publication Data
US 2012/0239932 A1    Sep. 20, 2012

(30) Foreign Application Priority Data

Dec. 4, 2009    (ES) .................................. 200902326

(51) Int. Cl.
*H04L 29/06* (2006.01)
(52) U.S. Cl.
USPC ................ 713/170; 380/201; 726/26; 705/12
(58) Field of Classification Search
USPC ........................................................ 713/170
See application file for complete search history.

(56) References Cited

U.S. PATENT DOCUMENTS

| | | | |
|---|---|---|---|
| 7,409,557 B2* | 8/2008 | Teppler ........................ | 713/178 |
| 2003/0159032 A1* | 8/2003 | Gerck ........................... | 713/156 |
| 2005/0028009 A1* | 2/2005 | Neff ............................. | 713/201 |
| 2005/0193198 A1* | 9/2005 | Livowsky ..................... | 713/168 |
| 2012/0144186 A1* | 6/2012 | Puiggali Allepuz et al. . | 713/150 |

OTHER PUBLICATIONS

Morales-Rocha V. et al. "New voter verification scheme using pre-encrypted ballots". Computer Communications, Apr. 2, 2009, Elsevier Science Publisher, Amsterdam, NL, vol. 32, pp. 1219-1227. doi:10.1016/j.comcom.2009.03.007.

Fontaine C. et al. "A survey of Homoorphic Encryption for Nonspecialists". Hindawi Publishing Corporation. EURASIP Journal on Information Security, 2007, article ID 13801, pp. 1-10. doi:10.1155/2007/13801.

* cited by examiner

*Primary Examiner* — Hadi Armouche
*Assistant Examiner* — Bryan Wright
(74) *Attorney, Agent, or Firm* — Hess Patent Law Firm LLC; Robert J. Hess

(57) ABSTRACT

Method for verifying that an item of information relating to an issuer has been registered correctly by a receiving entity while preserving the issuer's privacy, which method includes the following steps: a) the information relating to the issuer is coded in an issuing entity and said coding is sent to the receiving entity; b) the receiving entity generates a content test on the basis of the information coded in step a), and the content test is subsequently sent to the issuing entity; and c) the issuer verifies that the content test corresponds to the information which has been coded.

18 Claims, 4 Drawing Sheets

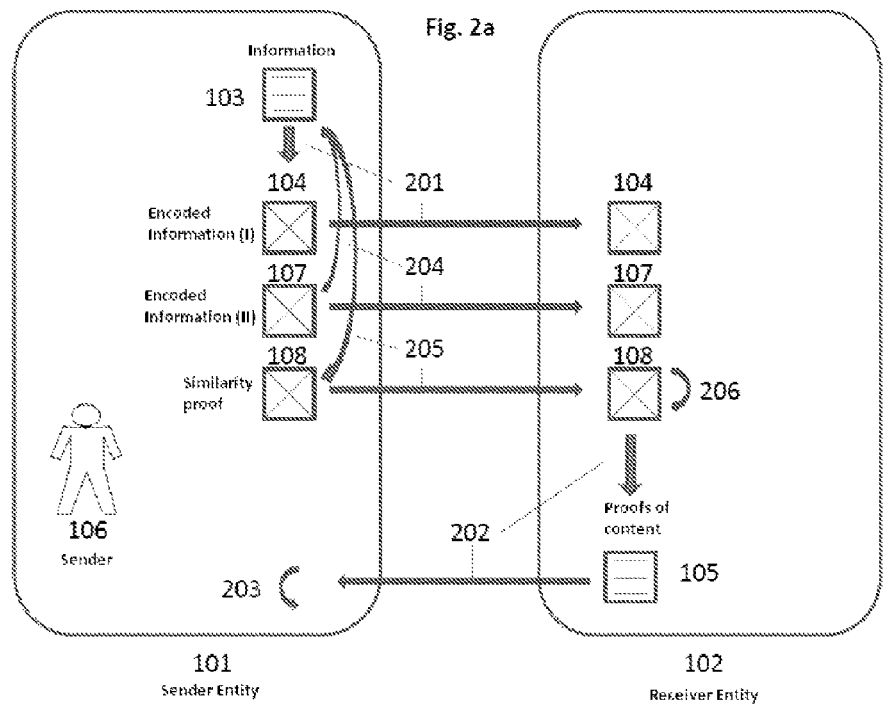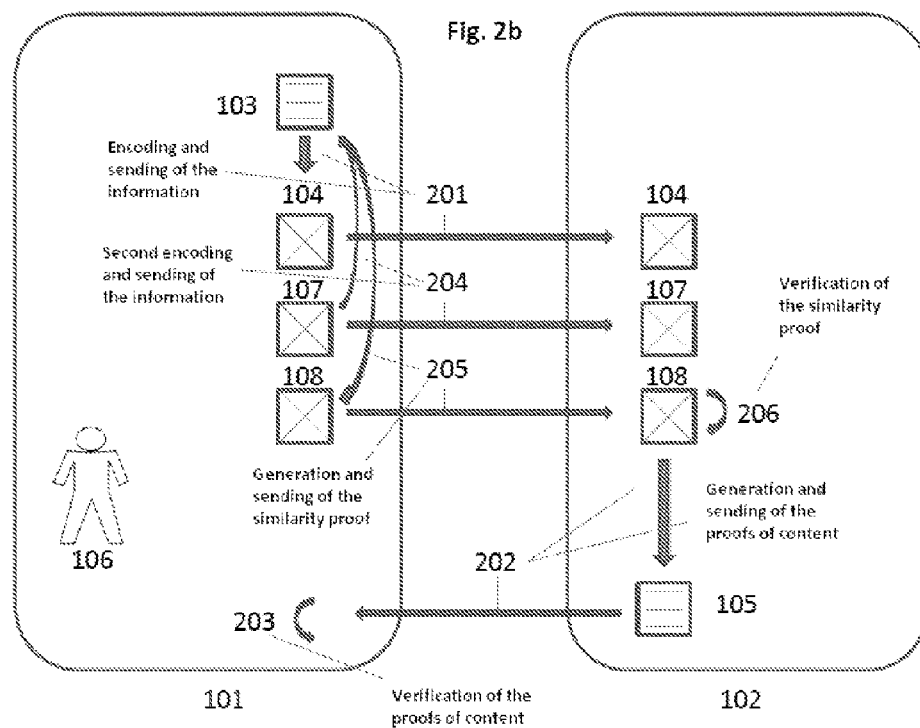

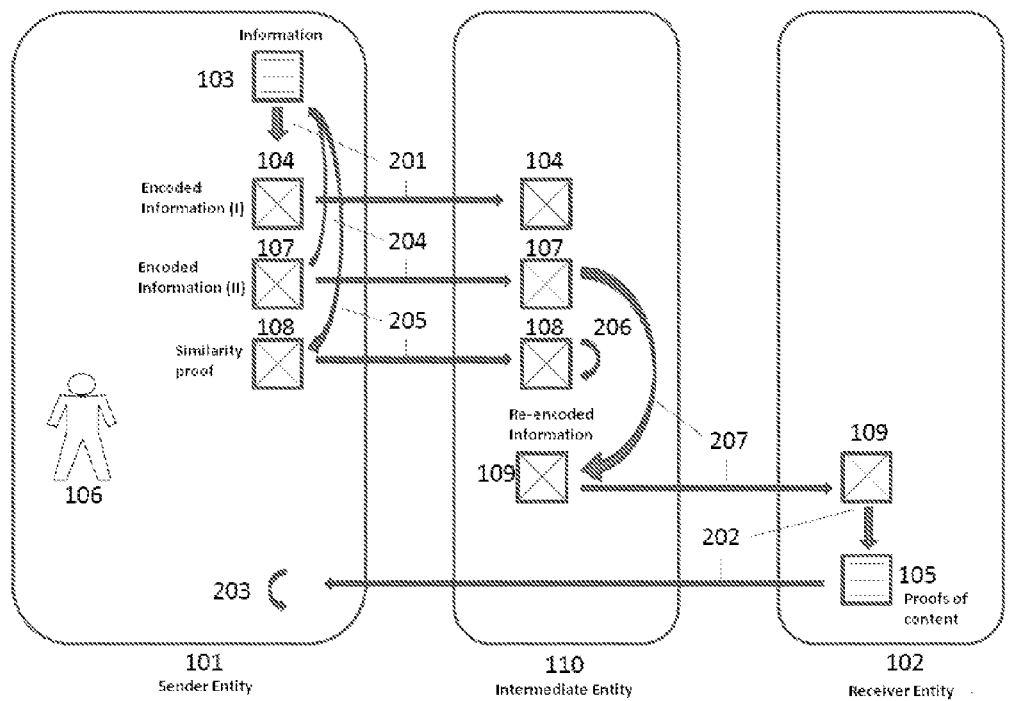
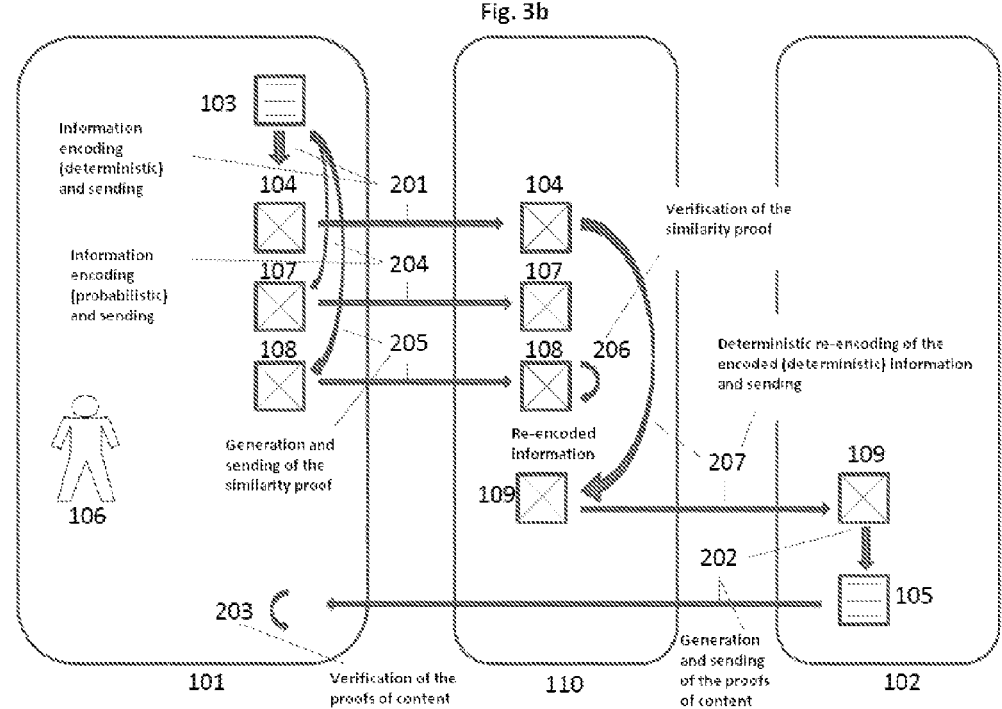

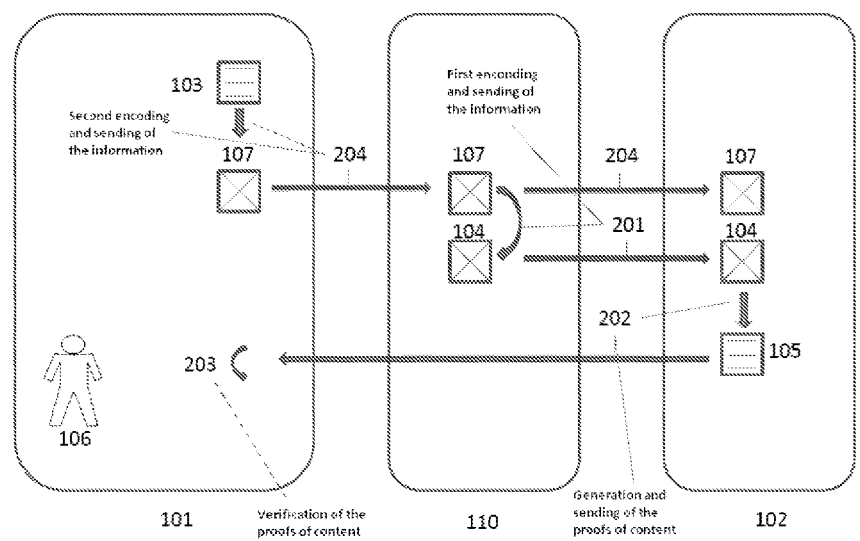

PRESERVING PRIVACY OF DIGITAL COMMUNICATION INFORMATION

FIELD OF THE INVENTION

The present invention mainly relates to the field of electoral processes, and it is intended to be used in applications where the verification of the correct recording of information is required. More specifically, the method can be used to verify that the information sent by a sender has been correctly received by the receiver. The present invention is especially relevant in processes where information is sent by senders whose identity has to remain private.

BACKGROUND OF THE INVENTION

For preserving the privacy of the of a sender information is usually encoded or encrypted before it has to be transmitted through an insecure channel, so that only the intended receiver of the information can decrypt and read it. Therefore, other people, entities or systems with access to this information are not able to read it.

Encryption can be used to protect the privacy of the sender but it not to preserve the information integrity. In fact, this information may be modified during the encryption process or the transmission, so the receiver could not receive the same information sent by the sender. Therefore, it is important to provide to the sender means for detecting modifications in the transmitted information and therefore, for verifying that the information recorded by the receiver is the same the sender sent. Digital signatures of the encrypted information can be used to ensure that the integrity of the information is preserved during transmission. However, they cannot be used to verify that the information has been properly encrypted. Therefore, the sender should have to trust the encryption process. The encryption process is usually done by specific software which is susceptible to be manipulated by an external entity with the end to modify the information before encrypting. One solution could be digitally signing the information and encrypt the information and its signature together. However, this approach compromises the privacy of the sender, since information, once decrypted, would be linked to the identity of the sender by the digital signature also obtained in the decryption process.

In scenarios where the initial receiver of the information is not the final destination, and therefore the former does not have the ability to decrypt this information, verifying that the information received by the initial receiver is the same one sent by the sender is a complex process. Several methods can be used to solve this problem.

Verifying that the Sent Information is the Same it was Intended to Send

In some schemes it is important for a sender, who sends an encoded message to a receiver entity, to be able to verify that the received encoded message contains the information encoded by the sender, without compromising neither the secrecy of the sent information (at least until this information is decoded) nor the sender anonymity. An example of such scheme is an electronic voting process, where the voter chooses her voting options, which are encoded and stored in a receiver device. The digital signature allows verifying that the information, once encoded and digitally signed (actions done before sending and/or storing it), has not been manipulated. However, the information can be manipulated during the encoding process.

When the voting options are encoded, the voter usually has to trust that the encoding process is really encoding the options she has chosen and therefore, that these options are present in the encrypted message received by the receiver entity.

Several techniques have been developed to allow the voter to verify that the encoded sent message corresponds to her voting intent. Some of these techniques make an end-to-end verification, where the receiver of the encoded message proofs to the sender that the received encrypted message contains is the same information encrypted by the sender. Other techniques focus on the verification of the encoding process.

End-to-End Verification

[Ch01] and [Ma02] describes a method for the end-to-end verification of the content of an encoded message or vote, in such a way that the receiver provides to the voter a proof proving that the received encoded vote contains the voting options selected by the voter.

This verification method is based on the generation, before the voting phase, of codes assigned to each candidate or voting option that are equivalent to the encoding of that option. A second code (known as return code) is calculated from each first code, using a cryptographic operation (for example, a Hash function) and a secret parameter.

These both code pairs are sent in voting cards to the voters. The codes are calculated in such a way that they are different for each voter, candidate and voting card.

At the time of voting, the voter selects the codes corresponding to the voting options she wants to choose, and sends them to a voting server. The voting server generates the corresponding return codes from the received voting option codes using a secret parameter only known by the server. Then, it sends the generated return codes to the voter, who checks that they match the return codes printed in her voting card assigned to the voting options she has selected.

Since the secret parameter, needed to generate the return codes, is only known by the voting server, and that these codes are not stored but calculated from the received codes, the voter can verify that the options she has chosen are related to the codes received by the server. Moreover, since the return codes are calculated from the values of the codes representing the voting options, the secrecy of the vote is preserved.

The main weakness of this method is in the protection of the voting cards. Since the candidate codes are different for each voting card and are not related with the names of the candidates, anyone who has access to the voting cards before the voting phase could exchange the codes of two candidates, shifting then the votes for one candidate to the other. Another important weakness is the usability of this system: introducing and checking alphanumeric codes increases the complexity of the voting system from the voter point of view.

Verification of the Encoding Process

In [Be06] a different idea, where the verification is focused on checking the encoding process, is presented.

After the sender has chosen the message content, this is encoded by an entity which commits to the resulting encoded message. That way, after encoded message cannot be modified. After this operation, the sender can choose between two options: send the message or, in case she wants to verify, ask to the entity that encoded the message to decode it, so the sender can check if the content of the encoded message corresponds to the selections she made. In case the verification is performed, the encoded message (which content has been disclosed) is rejected and a new encoded message is created from the same content in order to protect the sender privacy. Since the verification is a decision of the sender of the information, she can give to the encoding entity information different from his intent, in order to preserve the confidentiality if the information is decoded for the verification.

An implementation based on the system proposed in [Be06] is done in [Ad08]. Once the message has been encoded and the entity in charge of doing this encoding has committed to the result, there are two options: send the encoded message or verify the encoding process. This method differs from the previous one from the fact that, instead of doing the verification by asking to the entity in charge of encoding the message to decode it, the sender asks to the entity for releasing certain parameters used to encode for verifying in an independent way that the encoding is correct.

Another proposal based on [Be06] is [Sa08]. This proposal is specifically designed for polling places where voters cast their votes using voting machines. In the proposal, the voting machines are interconnected by means of a local network isolated from external networks, so that a message from an external network cannot access the local one.

When a voter casts a vote encoded in one of the voting machines, it is sent through the local network and stored in all the voting machines of the polling place. After this "publication" of the encoded vote in all the machines, the voter can choose between verifying if the content of the encoded vote matches her selected options or definitively cast it (although it has been already sent). In case the voter chooses to cast the encoded vote, the machine stores a record of this acceptance, since the vote has already been sent to all the machines of the polling place. Otherwise, if the voter chooses to verify that the encoded options are the same she chose, the machine publishes the information used to make the encoding through the local network.

With the intention of providing a verification method in real time, the proposal considers that the local network may be connected to an external network or Internet by means of a data diode ensuring the information only flows in one direction, so that an external observer can observe the data traffic in the local network in real time. Then, the voter or an external observer can capture the vote and the released encoding parameters in order to verify that the encoded options are those which were selected. Once a vote is audited, it is rejected in all the voting machines through the local network.

The main drawback of these methods is that the voter has to use an alternative system to verify the correct encoding of the options once the system releases the encoding parameters. The cryptographic operations needed to perform this verification cannot be done by hand or using a conventional calculator. The use of an alternative device to make these calculations may lead to verification problems and usability issues for the voter.

The described methods for the verification of the correct registration of information have an important usability problem: users have to do complex operations to perform the verification, such as the comparison of numerical or alphanumerical codes, or mathematical operations with large numbers.

The present invention is based on a method for the verification of the correct registration of information solving the usability problems of the existing methods.

BRIEF DESCRIPTION OF THE DRAWINGS

FIG. 2a identifies the components of the method for the verification of the correct recording of information when additional steps are implemented:
101: sender entity.
102: receiver entity.
103: information to encode.
104: encoded information (first encoding).
105: proofs of content.
106: sender.
107: encoded information (second encoding).
108: similarity proof.

FIG. 2b shows the general process of the presented invention, with the functionalities added by the additional steps. In this figure, the process in which two encodings of the original information 103, are done 104, 107, related by a similarity proof 108, and sent to the receiver entity 102, which sends proofs of content 105 corresponding to the encoded information 104, 107, to the sender entity 101 to verify the correct recording of the information, is presented. The processes involved in this FIG. 2b are:
  The sender entity 101 encodes and sends the original information 103 to the receiver entity 102.
  The sender entity 101 generates a second encoding 107 of the original information 103 and sends it 204 to the receiver entity 102.
  The sender entity 101 also generates and sends 205 to the receiver entity 102 a similarity proof 108 relating the first encoding of the information 104 and the second one 107.
  The receiver entity 102 verifies 206 the similarity proof 108.
  The receiver entity 102 generates 202 the proofs of content 105 from the information encoded for the first time 104 or for the second 107 and sends them 202 to the sender entity 101.
  The sender entity 101 verifies 203 the proofs of content 105 in order to verify the correct recording of the encoded information 104, 107 in the receiver entity 102.

Figure 1A:
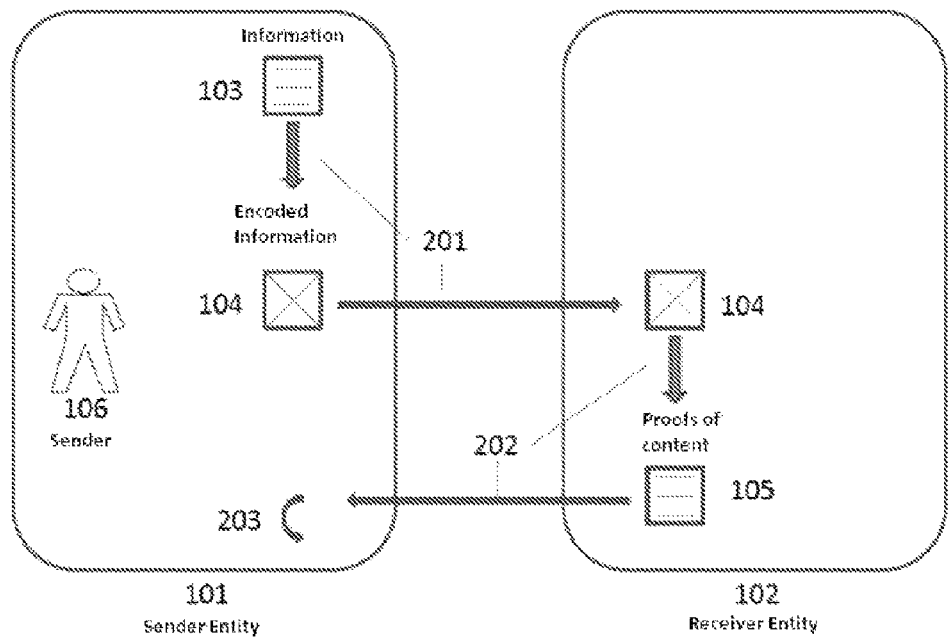
FIG. 1a identifies the basic components of the method for the verification of the correct recording of information:
101: sender entity.
102: receiver entity.
103: original information to encode.
104: encoded information.
105: proofs of content.
106: sender.
Figure 1B:
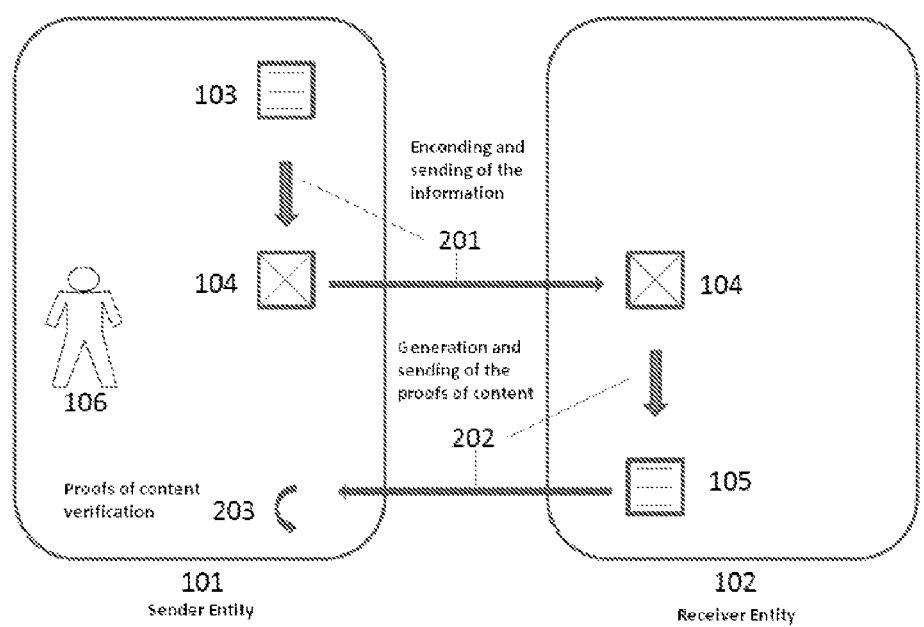
FIG. 1b shows the general process of the invention, presented with the basic steps. In this figure the details of the process are presented: the original information 103 is encoded and sent to the receiver entity 102, which sends proofs of content 105, corresponding to the encoded information 104 to the sender entity 101 to verify the correct recording of the information. The processes involved in this FIG. 1b are:
  The sender entity 101 encodes and sends 201 the original information 103 to the receiver entity 102.
  The receiver entity 102 generates proofs of content 105 from the encoded information 104 and sends those 202 to the sender entity.
  The sender entity 101 verifies 203 the proofs of content 105 in order to verify the correct recording of the encoded information 104 in the receiver entity 102.

The FIG. 3a identifies the components of the method for the verification of the correct registration of information in an example of an implementation where an intermediate entity performs one or several intermediate steps for the generation of encrypted information:
101: sender entity.
102: receiver entity.
103: information to encode.
104: encoded information (first encoding).
105: proofs of content.

106: sender.
107: encoded information (second encoding).
108: similarity proof.
109: re-encoded information.
110: intermediate entity.

FIG. 3b shows an example of implementation of the presented invention. In the figure, the following process is detailed: two encodings of the information are done, one using an algorithm with deterministic properties 104 and another one using an algorithm with probabilistic properties 107. A similarity proof 108 relating both encodings is sent, and the encrypted information 104 is re-encrypted in an intermediate entity 110, which sends it to the receiver entity 102 in order to generate the proofs of content 105 from the re-encrypted information 109. The proofs of content 105 are then sent to the sender entity 101. The processes involved in this FIG. 3b are:

- The sender entity 101 encodes the original information 103 in a deterministic way and sends it 201 to the intermediate entity 110.
- The sender entity 101 generates a second probabilistic encoding 107 of the original information 103 and sends it 204 to the intermediate entity 110.
- The sender entity 101 also generates and sends 205 to the intermediate entity 110 a proof of similarity 108 relating the first encoding of the information 104 and the second one 107.
- The intermediate entity 110 verifies 206 the similarity proof 108.
- The intermediate entity 110 performs a re-encoding with a deterministic algorithm 207 of the encoded information 104 and sends it 207 to the receiver entity 102.
- The receiver entity 102 generates 202 the proofs of content 105 from the re-encoded information 109 and sends them 202 to the sender entity 101.
- The sender entity 101 verifies 203 the proofs of content 105 in order to verify the correct recording of the encoded information 104, 107.

FIG. 4 shows another example of implementation of the presented invention. In this figure, the following process is detailed: a second encoding 107 of the original information 103 is done in the sender entity 101, which is sent to the intermediate entity 110 for performing a first encoding 104 of the information. These encodings are sent to the receiver entity 102 to generate the proofs of content 105, which are sent to the sender entity 101 in order to verify the correct recording of the information. The processes involved in this FIG. 4 are:

- The sender entity 101 performs a second encoding of the information (with probabilistic properties) 107 and sends it 204 to the intermediate entity 110.
- The intermediate entity 110 performs 201 a first encoding of the information (with deterministic properties) 104 from the encoded information 107, and sends both encodings 201, 204 to the receiver entity 102.
- The receiver entity 102 generates 202 the proofs of content 105 from the encoded information 104 and sends them 202 to the sender entity 101.
- The sender entity 101 verifies 203 the proofs of content 105 in order to verify the correct recording of the encoded information 104, 107.

BRIEF DESCRIPTION OF THE INVENTION

The present invention describes a method for the verification of the correct recording of information. For example, for checking that the information received by a storage media is the same it was delivered.

This verification method can be used in schemes where a sender sends information to a receiver, and the sender wants to verify that the information received by the received is the same it was sent. This verification method is suitable to be used in schemes where the privacy of the sender has to be ensured.

The method described in this invention is characterized by the verification of the correct recording of information is done while preserving the privacy of the sender of such information. The method is based on the receiver calculation of a proof of content from the received encoded information without the need of decoding this information. This proof of content is known in advance by the sender, so that the sender can verify that the known proof of content matches the one generated by the receiver.

In a basic embodiment, the method is composed by the following steps:

a) One or several senders encrypting, in a sender entity, the original information, and sending it to the receiver entity;

b) The receiver entity generating a proof of content (also known as return code) of the received encrypted information. The proof of content is sent to the sender entity;

c) The senders verifying that the proof of content received by the sender entity matches the original information which was encrypted.

In a preferred embodiment the method is based on using an asymmetric cryptographic algorithm with deterministic properties to encrypt the information. In case of using the ElGamal cryptosystem, the random value used during encryption is fixed in order to get a deterministic encryption system. Once this encrypted information is received at the receiver entity, it calculates one or several proofs of contents from the received information encrypted in a deterministic way, using a one-way cryptographic function, such as a Hash or HMAC function, to generate the proofs of contents.

In case the encrypted information is composed by a set of individual encrypted messages, proofs of content are generated from each received encrypted message individually, or from the whole set of encrypted messages.

A second encryption of the information is also considered. In a preferred embodiment, the contents of the result of the different encryptions of the information are correlated by using a similarity proof. This proof can be a cryptographic zero-knowledge proof demonstrating that the result of the second encryption of the information is the re-encryption or the partial decryption of the result of the first encryption of the information. In an implementation where the ElGamal cryptosystem is used to encrypt the information, the Schnorr Identification Protocol can be used to generate this cryptographic zero-knowledge proof.

In a preferred embodiment, the encrypted information is composed by a set of individual encrypted messages, which are encrypted twice. In this embodiment, the proof of similarity is calculated from both sets of encrypted messages, in such a way that it can be used to verify that the result of encrypting the first set of individual messages is the re-encryption or the partial decryption of the second encrypted set of individual messages. In a specific implementation, encryption algorithms with homomorphic properties are used, such as ElGamal, Paillier, or those based on Elliptic Curve Cryptography.

In another embodiment more than two encryptions of the information are done. In this case, proofs of similarity relating the contents of the different encryptions are generated.

In an alternative embodiment, the method uses an asymmetric encryption algorithm with probabilistic properties to encrypt the information. The proofs of content are generated in the receiver entity by applying a one-way cryptographic function to the received information, such as a Hash or HMAC function. In a specific implementation the receiver entity performs a partial decryption of the received encrypted implementation, which does not reveal the plaintext information, and the proofs of content are generated from the result of this partial decryption.

The method of the present invention can be used in electronic voting environments in order to verify the correct recording of the encrypted voting options cast by the voters and received in a voting service.

DETAILED DESCRIPTION OF THE INVENTION

The present invention describes a method for the verification of the correct recording of information. This verification method is suitable to be used in schemes of information recording where the privacy of the sender of the information has to be preserved. This method can be applied in electronic voting schemes, to facilitate the voters the verification of the correct recording of their vote without compromising voter privacy.

The method for the verification of the correct recording of information, described in this invention, is based on the receiver calculation of a proof of content from the received encrypted information without the need of decrypting this encrypted information. This proof of content is used by the sender to check that the encrypted information received by the receiver corresponds to the original information before being encrypted, without disclosing to the receiver this original information (plaintext).

The method is independent of the channel used for the transmission of the information from the sender to the receiver. This channel may be a communication network, a storage media (like a CD or DVD), etc. The channel for transmitting back the proof of content from the receiver of the information to the sender may be a different one from the used for transmitting the information.

The verification method described in the present invention is composed by the following steps:
  a) One or several senders encrypting, in a sender entity, the original information, and sending it to the receiver entity;
  b) The receiver entity generating a proof of content (also known as return code) of the received encrypted information. The proof of content is sent to the sender entity;
  c) The senders verifying that the proof of content received by the sender entity matches the original information which was encrypted.

Encryption and Sending of the Information

In the encryption step, a sender (i.e., a voter) uses a sender entity (a computer, for example) to encrypt an information or set of messages (i.e., votes) in order to preserve her privacy.

In a first embodiment, asymmetric cryptographic algorithms are used to encrypt the information. The public component P of the cryptographic key used by the encryption algorithm is used to encrypt the information.

Additionally, the encryption algorithm may have homomorphic properties. Some cryptographic algorithms from the state of the art, such as ElGamal, Paillier or those based on Elliptic Curve Cryptography have this property.

In a specific implementation the encryption algorithm may have homomorphic and deterministic properties. This deterministic property makes an encryption algorithm to generate always the same value for the same specific sender. Therefore, different sender will have different encryption values of the same information. In case the ElGamal cryptosystem is used, the random value used during encryption as an exponent is fixed in order to get a deterministic encryption system. Unique parameters are, used per sender and encoded information to obtain a fixed deterministic encryption for each combination of sender and information content. In a specific implementation, each sender has a unique identifier and the identifier of the information to be encrypted is obtained by applying a one-way function (i.e., a Hash function) over said information. Therefore, the encryption exponent is fixed as the result of the combination of the sender unique identifier and the result of a one-way function over the original information (i.e., a Hash function). This combination can be the concatenation of both values or the result of applying a Hash function over the result of this concatenation.

In an alternative embodiment the encryption process with deterministic properties is done by an intermediate entity, different from the sender entity, using the information already encrypted by the sender entity: the sender entity still encrypts the information but using a cryptographic scheme with probabilistic properties. The result of this encryption is sent to the intermediate entity, which encrypts again this information using a cryptographic scheme with deterministic properties. The intermediate entity can perform the second encryption (i) over the whole encrypted information, (ii) over the encryption values used by the sender entity to encrypt the message, or (iii) over a part of it. An example of the first case is the addition of an extra layer of encryption over the information (i.e., re-encryption using a different cryptographic key or a different encryption algorithm). An example of the second case is the modification of the encryption values used to encrypt the message at first (i.e., using the same encryption algorithm and the same cryptographic key), so that the result looks different. In a specific implementation the ElGamal cryptosystem is used by the intermediate entity to encrypt or re-encrypt the encrypted information provided by the sender entity.

In a third embodiment the deterministic encryption is done jointly by the sender entity and the intermediate entity. The result of this double deterministic encryption process is provided to the receiver entity.

The encrypted information is sent by the sender entity using a physical or logical channel. In a preferred embodiment, the physical channel is the postal channel or FAX. In these schemes, the encrypted information would be printed or recorded in paper format or an equivalent before being sent. In another preferred embodiment a communication network, such as Internet, is used as the logical channel. In this case, the encrypted information is represented in a logical format, such as binary or electronic among others.

Logical/physical hybrid channels are also considered for transmitting the encrypted information. In that case, the encrypted information would be logically stored in a physical media, such as a CD-ROM, magnetic tape or removable storage media. The physical media can be sent through a physical channel to the receiver entity, using one of the physical channels mentioned before or simply by hand.

Encryption can be performed over the whole set of information or over individual parts of this information (i.e., individual messages). In the second option, the encrypted individual messages composing the information can be combined before sent, or sent independently. In a preferred embodiment the information is divided in individual messages which are encrypted independently, in such a way that the combination (i.e., concatenation) or operation (i.e., arithmetic multiplication or addition) of such messages can be used to recover the encrypted information as it was before division. Optionally, these encrypted messages could provide partial information of the whole set in case they are decrypted individually. In a specific implementation, the information is divided in individual encrypted messages that, once decrypted, provide meaningful partial information about the whole set. For example, each message could contain a selection of the set of selections made by the voter to vote. Optionally, the information set, once divided in messages, could contain messages with neutral information which do not modify the content of the whole information set. This technique can be used to prevent breaking the privacy of a sender in case some information can be deduced from the number of messages in which the information set is divided: one sender sending the information divided in a unique number of encrypted messages that differs from the number of encrypted messages generated by the other senders, could lose her privacy if the information, once decrypted, generates a vote that is the only one with the same number of selections. For instance, in an electronic voting scheme this could generate a vote containing a unique number of selections that is not chosen by any other voter. In this specific implementation all the votes are composed by the same number of individual messages or selections (as much as the maximum allowed) and the messages corresponding to selections not made by the voter could be represented as empty encrypted selections.

In another preferred embodiment the content of the information to be encrypted is previously converted to a numeric value, so that individual messages representing the whole set of information can be operated using arithmetic techniques, such as the product or addition. This conversion can be done at the level of the whole information set, or at the level of the individual messages in which this set can be split. Using as reference the electronic voting scheme, a vote could be converted into a set or array of numerical values, each one uniquely representing the value of each selection. This conversion could be unnecessary in case the original information is already numeric value or can be decomposed into numerical values. In a specific implementation, each individual message is represented by a prime number, so that the messages can be operated by multiplying their numerical prime value representing the selection and then factorized to obtain the original information. In this case, null selections are represented by the neutral value of the product: the number 1. The calculations may be done in a finite field when operating the individual encrypted messages.

In a specific implementation, the information is represented as a set of prime numbers, each prime number representing information of the message such as a selection, that are encrypted using a cryptographic encryption algorithm with multiplicative homomorphic properties (for example, ElGamal). This specific implementation is intended to be used to verify the content of each individual message at reception, and then compact the encrypted messages by operating all or some of them using the homomorphic properties of the encryption algorithm. The original information (the set of selections) can be retrieved by factorizing in prime numbers the value obtained once the compacted encrypted messages are decrypted.

Generation of a Proof of Content

In this step, the receiver entity generates a proof of content of the encrypted information and sends said proof to the sending entity. In case the information has been split in encrypted individual messages before being sent, the receiver entity can generate and send a proof of content of each individual message.

In a preferred embodiment a one-way function, such as a Hash function, is used to generate the proof of content:

Proof of content: $PC(m)=H(E(m))$, where $E(m)$ is the result of the encryption of the information m.

In another preferred embodiment the receiver entity has a cryptographic secret key S to generate the proof of content by means of a MAC function, such as an HMAC:

Proof of content: $PC(m)=HMAC(E(m), S)$, where $E(m)$ is the result of the encryption of the information m.

In case the encrypted information is composed by a set of encrypted individual messages, in another preferred embodiment the receiver entity generates as many proofs of content as individual messages. In this scheme, said proofs can be operated between them in order to obtain one proof of content. For example, by means of a XOR operation:

$$PC(m_1) = HMAC(E(m_1), S)$$
$$PC(m_2) = HMAC(E(m_2), S)$$
$$PC(m_3) = HMAC(E(m_3), S)$$
$$\ldots$$
$$PC(m_n) = HMAC(E(m_n), S)$$

$PC=PC(m_1)\square PC(m_2)\square PC(m_3)\square \ldots \square PC(m_n)$, where n is the number of individual messages, and m represents an individual message.

In an embodiment where an encryption algorithm with homomorphic properties has been used to encrypt the individual messages, the proof of content is generated from the result of the operation of several individual encrypted messages:

$$E(M)=E(m_1)\phi E(m_2)\phi \ldots \phi E(m_n)$$
$$PC(M)=HMAC(E(M),S).$$

In an embodiment where the information has been encrypted using an encryption algorithm with probabilistic properties in step a), the encrypted information may be partially decrypted by the receiver entity in this step, with the purpose of eliminating the random factor of the encryption performed in step a), without disclosing the content of the encrypted information. In this scheme, the proofs of content are generated from the partially decrypted information.

Verification of the Proof of Content

In this step, the senders verify that the proof of content has been obtained from the original information, which was encrypted and sent.

In a preferred embodiment, senders of the information have in advance a list with the values of the proofs of content for each possible information or each possible set (or subset) of messages to be sent.

This list can be calculated in a step previous to the step a) from the knowledge of the set of possible information values or messages the senders can send. In a specific implementation, these values are calculated in a step previous to the step a) using the cryptographic secret key S of the receiver entity and the result of the encryption of all the possible information values or messages using an encryption algorithm with deterministic properties and using the unique identifier for each sender specified in step a).

In case a set of encrypted individual messages has been sent, and the receiver entity generates one proof of content from the values of the set or a subset of the received encrypted messages, said list can specify the proofs of content related to sets or subsets of messages from which only one proof of content is generated. Therefore, in this step the sender has to verify one proof of content for a set or a subset of messages.

Additional Steps

The invention considers the implementation of three additional steps for the generation and sending the result of a second encryption of the information, the generation and sending of a similarity proof, and the verification of the similarity proof.

Second Encryption and Sending of Information

This step may be performed before or after the step a) of encryption and sending of the information.

In this step, the original information which is encrypted in step a) is encrypted again by the same sender entity, and sent to the same receiver entity. The encryption algorithm used in this step can be the first used in step a) for the encryption of the information.

In a preferred embodiment an asymmetric encryption algorithm is used to encrypt the information using a cryptographic public key P. Either the same encryption algorithm and public key used in step a), or different ones, are used.

In another preferred embodiment an asymmetric encryption algorithm with probabilistic and homomorphic properties is used to encrypt the information in this step. Therefore, it will not be possible to connect the result of the encryption with the original information. In case the ElGamal encryption scheme is used, the random value used for the encryption (the exponent) will be chosen in a random way (not fixed).

The result of the second encryption of the information can be sent in the same way than in step a). In a preferred embodiment the same transmission channel used in step a) is used. Optionally, the result of the encryption in this step can be sent through a transmission channel different than the one used in step a).

The encryption process can be done over the whole set of information or in parts of it (for example, for each individual message in which the information may be split), in the same ways explained in step a).

Generation and Sending of a Similarity Proof

In this step, the sender entity generates a similarity proof between the result of the encryption of information in step a) and the result of the second encryption of information. The sender sends said proof to the receiver entity.

This step is performed after the two steps of encryption (first and second encryptions). The similarity proof can be sent alone or jointly with one of the two or both results of encryptions. The way the similarity proof is sent, as well as the transmission channel, may be one of the types previously presented for sending the encrypted information.

In a preferred embodiment the similarity proof can be obtained from a zero-knowledge proof which demonstrates that the original information contained in two results of encryptions, or cipher texts, is the same. In a specific implementation, the two encryption processes use encryption algorithms with homomorphic properties, which allow re-encryption or partial decryption operations. Therefore, the zero-knowledge proof can demonstrate that the result of one of the encryptions is the re-encryption or the partial decryption of the other result of encryption. In case the ElGamal cryptosystem is used in both encryption processes, the zero-knowledge proof can be implemented using the Identification Protocol of Schnorr. The zero-knowledge proof can be either interactive or not.

The following components are used in the ElGamal encryption scheme:
g generator of a subgroup $G_q$ from $Z_p^*$ q is a large prime, and p=2*q+1, also prime.
private key: x x random number in $Z_q$
public key: (h, g) where $h=g^x \mod p$
message: m Encryption is calculated as:

$c=(m \cdot h^r, g^r)$ where r is a random number in $Z_q$.

When decrypting, the message m is recovered as $m=c*(g^r)^{-x}$.

In case an encryption algorithm with deterministic properties is used in step a):

$c_1=(m \cdot h^v, g^v)$ where v is a number in $Z_q$ calculated from some fixed values (i.e., unique identifiers of the sender and the message).

In case the algorithm used for performing the second encryption has probabilistic properties:

$c_2=(m \cdot h^r, g^r)$ where r is a random number in $Z_q$.

Being r=v+r', $c_2$ can be considered as the re-encryption of $c_1$ with the factor r', and the zero-knowledge proof based on the Scnorr Identification Protocol can be calculated in the following way:
Calculate $c_2/c_1=(1 \cdot h^{r'}, g^{r'})$.
Defining g'=h y $h'=h^{r'}$, it can be proved in zero knowledge that the re-encryption factor r' is known:
Select a random number e, e≤q−1, and calculate $w=g^e$.
Calculate d=H(w|h'|g'|h|g), where H is a Hash function.
Finally, calculate s=r'·d+e.
The zero-knowledge proof, proving that both encryption results contain the same contents is composed by the parrneters [w, s].

In case this proof is generated over a set of messages, the use of algorithms with homomorphic properties is considered. In this type of algorithms, the operation of the encrypted messages with an operation φ produces as result the encryption of the messages operated with the operation Θ. This way, an encrypted message can be obtained as a result of operating a set of encrypted messages:

Being $E_P(m)$ the encryption of a message with a public key P, the encrypted message, resulting from the operation of n messages is $E_P(M)=E_P(m_1)\phi E_P(m_2)\phi \ldots \phi E_P(m_n)$, where
$M=m_1 \Theta m_2 \Theta \ldots \Theta m_n$ The encrypted message resulting from the operation of the messages encrypted in the step a) is $E_{1P}(M)=E_{1P}(m_1)\phi E_{1P}(m_2)\phi \ldots \phi E_{1P}(m_n)$, where
$M=m_1 \Theta m_2 \Theta \ldots \Theta m_n$ On the other side, the encrypted message resulting from the operation of the messages encrypted in the second encryption step is $E_{2P}(M)=E_{2P}(m_1)\phi E_{2P}(m_2)\phi \ldots \phi E_{2P}(m_n)$, where
$M=m_1 \Theta m_2 \Theta \ldots \Theta m_n$ The zero-knowledge proof demonstrating that both sets of individual encryptions of messages have the same content can be reduced in a proof that both encrypted resulting messages have the same content. This proof can be a proof of re-encryption or of partial decryption. In case the ElGamal encryption system is used in both encryption processes, the zero-knowledge proof can be implemented using the Schnorr Identification Protocol.

In case an encryption algorithm with deterministic properties has been used in step a):

$E_1(m_i)=(m_i \cdot h^{vi}, g^{vi})$ where vi is a number in $Z_q$ fixed before the encryption process.

The encrypted message resulting from the operation of a set of n messages encrypted in step a) is $$C_1=(M \cdot h^v, g^v)=(m_1 \cdot h^{v1}, g^{v1})*(m_2 \cdot h^{v2}, g^{v2})* \ldots *(m_n \cdot h^{vn}, g^{vn}),$$ where $M=m_1*m_2* \ldots *m_n, y$ $V=v_1+v_2+ \ldots +v_n$.

In case the encryption algorithm used in the second encryption process has probabilistic properties:

$E_2(m_i)=(m_i \cdot h^{ri}, g^{ri})$ where n is a random number in $Z_q$.

The encrypted message resulting from the operation of the same set of n encrypted messages is $$C_2=(M \cdot h^R, g^R)=(m_1 \cdot h^{r1}, g^{r1})*(m_2 \cdot h^{r2}, g^{r2})* \ldots *(m_n \cdot h^{rn}, g^{rn}),$$ where $M=m_1*m_2* \ldots *m_n, yR=r_1+r_2+ \ldots +r_n$.

Being $r_i=v_i+r_i'$, $C_2$ can be considered as the re-encryption of $C_1$ using the re-encryption factor $R'=r_1'+r_2'+ \ldots +r_n'$. The Schnorr Integrity Proof can be calculated in the following way:

Calculate $C_2/C_1=(1 \cdot h^{R'}, g^{R'})$.
Defining $g'=h$ and $h'=h^{R'}$, it can be proved in zero knowledge that the value of the re-encryption factor R' is known:
Choose a random number e, $e \leq q-1$, and calculate $w=g^e$.
Calculate $d=H(w|h'|g'|h|g)$, where H is a Hash function.
Finally, calculate $s=R' \cdot d+e$.
The zero-knowledge proof, proving that both encryption results have the same contents is composed by the parameters [w, s].

Proof Verification

In this step, the receiver entity verifies that the received encryption results have been obtained from the same original information, using the received similarity proof.

In case this proof has been obtained from a zero-knowledge proof, the verification is performed by checking that the zero-knowledge proof has been generated from the received encrypted information (or received encryption results).

In a preferred embodiment, both encryptions have been done using algorithms with homomorphic properties and the same cryptographic public key or the same encryption factors, and the similarity proof has been obtained from a zero-knowledge proof of re-encryption or partial decryption.

In case an encryption algorithm with deterministic properties has been used in step a):

$c_1=(m \cdot h^v, g^v)$ where $v$ is a number in $Z_q$ fixed before the encryption process.

And the encryption algorithm used in the second encryption process has probabilistic properties:

$c_2=(m \cdot h^r, g^r)$ where $r$ is a random number in $Z_q$.

Being $r=v+r'$, the verification of the proof, proving the knowledge of the re-encryption of $c_1$ with the value r' to obtain $c_2$ is based on the verification of [w, s] in case the proof has been done using the Schnorr Identification Protocol:

Calculate $c_2/c_1=(1 \cdot h^{r'}, g^{r'})$.
Define $g'=h$ and $h'=h^{r'}$.
Calculate $d=H(w|h'|g'|h|g)$, where H is a Hash function.
Verify that $g'^s=w \cdot h'^d$.

In case the zero-knowledge proof has been generated from a set of messages which have been encrypted with cryptographic algorithms with homomorphic properties, where the operation of the encrypted messages with an operation φ results on the encryption of the messages operated with the operation Θ, the result of the operation of the messages encrypted in step a) and the result of the operation of the encrypted messages in the step c) is used to perform the verification.

In case the ElGamal encryption scheme has been used in both encryption processes, the zero-knowledge proof may consist in the Schnorr Identification Protocol implementation.

In case an encryption algorithm with deterministic properties has been used in the step a):

$E_1(m_i)=(m_i \cdot h^{vi}, g^{vi})$ where $v_i$ is a number in $Z_q$ fixed before the encryption process.

The encrypted message resulting from the operation of a set of n messages encrypted in the first step is:

$$C_1=(M \cdot h^v, g^v)=(m_1 \cdot h^{v1}, g^{v1})*(m_2 \cdot h^{v2}, g^{v2})* \ldots *(m_n \cdot h^{vn}, g^{vn}),$$ where $M=m_1*m_2* \ldots *m_n$ and $V=v_1+v_2+ \ldots +v_n$.

In case the encryption algorithm used in the second encryption process has probabilistic properties:

$E_2(m_i)=(m_i \cdot h^{ri}, g^{ri})$ where $r_i$ is a random number in $Z_q$.

The encrypted message resulting from the operation of the same set of n messages encrypted in the second encryption step is $$C_2=(M \cdot h^R, g^R)=(m_1 \cdot h^{r1}, g^{r1})*(m_2 \cdot h^{r2}, g^{r2})* \ldots *(m_n \cdot h^{rn}, g^{rn}),$$ where $M=m_1*m_2* \ldots *m_n$ and $R=r_1+r_2+ \ldots +r_n$.

Being $r_i=v_i+r_i'$, $C_2$ can be considered as the re-encryption of $C_1$ with the re-encryption factor $R'=r_1'+r_2'+ \ldots +r_n'$. In case the proof has been generated using the Schnorr Identification Protocol, the verification is done using the parameters [w, s]:

Calculate $C_2/C_2=(1 \cdot h^{R'}, g^{R'})$.
Define $g'=h$ y $h'=g^{R'}$.
Select a random number e, $e \leq g-1$, and calculate $w=g'^e$.
Calculate $d=H(w|h'|g'|h|g)$, where H is a Hash function.
Verify that $g'^s=w \cdot h'^d$.

REFERENCES

[Ch01] Chaum, D. (2001). "Surevote technical overview (slides)". http://www.vote.caltech.edu/wote01/pdfs/surevote.pdf

[Ma02] Malkhi, D; Margo, O; "Pavlov, E. E-voting without 'cryptography'". Conference Information: 6th International Conferene on Financial Cryptography, 2002, SOUTHAMPTON BERMUDA. FINANCIAL CRYPTOGRAPHY

[Be06] Josh Benaloh. "Simple verifiable elections". Proceedings of the USENIX/Accurate Electronic Voting Technology (2006). Vancouver, B.C., Canada.

[Ad08] Ben Adida. "Helios: web-based open-audit voting". *Proceedings of the 17th conference on Security symposium*, USENIX. Pages 335-348. Year of Publication: 2008

[Sa08] Sandler, D., Derr, K., and Wallach, D. S. 2008. "VoteBox: a tamper-evident, verifiable electronic voting system". In *Proceedings of the 17th Conference on Security Symposium*, USENIX Association. Pp. 349-364.

The invention claimed is:

1. A computer implemented method for verifying that information in a sender entity has been correctly recorded in a receiver entity, while preserving privacy by not revealing the information from the sender entity, comprising the following steps:
   a) encoding the information in the sender entity computer and sending the encoded sender information from the sender entity computer to a receiver entity computer;
   b) generating with the receiver entity computer a proof of content based on the encoded sender information, and sending the proof of content to the sender entity computer from the receiver entity computer;
c) verifying information with the sender entity computer, to thereby make a verification, that the proof of content received corresponds with the information in the sender entity computer by comparing values of the proof of content received with values of a proof of content known in advance that correspond to the verified information;
d) generating in the sender entity computer a further encoding of the information in the sender entity computer, and sending said further encoding to the receiver entity computer; and
e) computing a similarity proof demonstrating that the encoding from step a) and the further encoding from step d) have been done with the information in the sender entity computer, without revealing the information from the sender entity, and sending said similarity proof to the receiver entity.

2. The method according to claim 1, further comprising the following additional step:
f) the receiver entity verifying with the receiver entity computer that the similarity proof from step e) corresponds with the encoding in step a) and the further encoding in step d).

3. The computer implemented method according to claim 1, wherein the encoding from step a) has deterministic properties.

4. The computer implemented method according to claim 2, wherein the encoding from step a) has probabilistic properties.

5. The computer implemented method according to claim 2, wherein the encoding from step d) has probabilistic properties.

6. The computer implemented method according to claim 3, further comprising using an exponent value fixed from the values of the sender entity computer and the message to make an encoding with probabilistic properties to have deterministic properties.

7. The computer implemented method according to claim 2, wherein both the encoding used in step a) and the further encoding used in step d) have homomorphic properties.

8. The computer implemented method according to claim 2, further comprising using a common parameter in the encoding of step a) and the further encoding in step d), wherein the common parameter is a public key.

9. The computer implemented method according to claim 2, wherein the similarity proof of step e) is a zero-knowledge proof proving that the encoding of step a) is the re-encoding of the further encoding of step d).

10. The computer implemented method according to claim 2, wherein the information in the sender entity computer that is encoded in step a) and further encoded in step d) is composed respectively by a set of individual encodings from parts of said information in the sender entity computer.

11. The computer implemented method according to claim 9, wherein the similarity proof from step e) is composed by a set of similarity proofs between the set of individual encodings obtained in step a) and the set of individual further encodings obtained in step d).

12. The computer implemented method according to claim 2, wherein the proof of content from step b) is obtained by applying to the information encoded in step a) a one-way function from the group comprising SHA1, SHA2 or MD5.

13. The computer implemented method according to claim 2, wherein the proof of content from step b) is generated from the encoding of the information encoded in step a).

14. The computer implemented method according to claim 13, wherein the encoding is a cryptographic function using a secret key S assigned to the receiver entity, from the group consisting of a symmetric encryption and a MAC function.

15. The computer implemented method according to claim 9, wherein the proof of content generated in step b) is composed by the set of proofs of content generated from the individual encodings from step a).

16. The computer implemented method according to claim 15, wherein the proof of content generated in step b) is the result of applying the set of proofs of content generated from the individual encodings from step a).

17. The computer implemented method according to claim 1, further comprising an additional step g) where the values of the proofs of content for the verified information are generated and sent to the sender entity computer.

18. The computer implemented method according to claim 4, further comprising performing an additional step h) for partial decoding of the information in the sender entity computer that was encoded in step a) before generating the proof of content.

* * * * *